United States Patent Office 2,917,512
Patented Dec. 15, 1959

2,917,512

PREPARATION OF SULTAMS

Burckhardt Helferich, Bonner Talweg, Bonn, Germany, assignor to Schenley Industries, Inc., New York, N.Y., a corporation of Delaware No Drawing. Application March 11, 1958
Serial No. 720,558

Claims priority, application Germany March 22, 1957

8 Claims. (Cl. 260—243)

This invention relates to new and useful improvements in the preparation of sultams.

An object of the invention is the preparation of unsaturated sultams from the corresponding sultones. This and still further objects will become apparent from the following description:

In accordance with the invention, it has surprisingly been found that unsaturated sultones may be condensed with ammonia or primary amines yielding unsaturated sultams.

The starting unsaturated sultones are, for example, of the type obtained according to T. Morel and P. E. Verkade (Rec. 68:539 [1848]).

The reaction proceeds in accordance with the general reaction scheme:

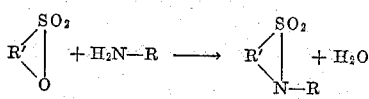

in which R represents a hydrocarbon radical and preferably an aryl radical and R' represents an unsaturated alkylene radical and preferably one containing two unsaturated olefinic bonds and 4 carbon atoms in the sultone and sultam ring, as for example, a divalent butadiene radical which may contain additional branch chains or substituents and which may even form a portion of an external cyclic ring configuration.

The reaction is simply effected by heating the reactants to a temperature at which water will be split off and preferably to the boiling temperature of the reaction mixture.

In addition to the unsaturated sultam a certain amount of unsaturated aminosulfonic acids and aminosulfonic acids substituted at the nitrogen atom are formed by a splitting of the sultone ring.

While it is known that sultones are useful as alkalating agents and that their reaction with primary and secondary amines results in the formation of the corresponding N-alkalation products and free sulfonic acids, the reaction, in accordance with the invention, is completely unexpected, since sulfonic acids as contrasted to carboxylic acids cannot be converted into the corresponding amides by treatment with primary or secondary amines.

The unsaturated sultams produced in accordance with the invention have the general formula:

in which R represents an aryl radical and R' represents a butadiene radical, including butadiene radicals containing branched chains and further ring configurations.

The unsaturated sultams, in accordance with the invention are highly stable and permit further reactions in the sultam ring as well as in the substituents at the sultam nitrogen atom.

The unsaturated sultam, in accordance with the invention, may be converted by conventional methods, as for example, by hydrogenation in the presence of Raney nickel catalysts to the corresponding saturated sultams.

The sultams constitute valuable therapeutic agents showing a high anticonvulsive activity in mammals, while at the same time having anesthetic properties, being effective in the lowering of the body temperature and showing high activity against alergic asthma.

The following examples are given by way of illustration and not limitation.

*Example 1*

8 g. (0.05 mole) of 2-methyl-1,3-pentadiene-1,4-sultone and 4.65 g. (0.05 mole) of freshly distilled aniline are heated with stirring in an open flask. A clear solution is obtained at 40° C. The solution begins to boil (liberation of water) between 135 and 140° C. This temperature is maintained for 10–15 minutes. On cooling, the brown residue gradually congeals to a crystalline mass. This is crushed, twice washed with 30 cc. of 4 N-hydrochloric acid and subsequently with water (crude product: 10.7 g., i.e., more than 90% of theory) and dissolved in as little benzene as possible; this solution is dried with sodium sulfate, clarified by means of charcoal, and slowly mixed with petroleum ether while stirring. As a result, 2-methyl-1,3-pentadiene-N-phenylsultam precipitates.

For complete purification the substance may be precipitated once more from benzene by means of petroleum ether or recrystallized from water-methanol. The substance forms thin, felted needles melting at 113–114°. When exposed to light, it takes on a yellowish-brown color. It is readily soluble in acetone, chloroform, benzene and dioxane, sparsely soluble in cold water as well as in aqueous acids and alkalies, even more difficultly soluble in ether and cyclohexane, and insoluble in petroleum ether.

Hydrogenation with Raney nickel in methanol converts the compound very easily and smoothly into the saturated sultam, 2-methylpentane-N-phenyl-1,4-sultam. This compound, forming white needles and flakes, precipitates from the methanol solution upon addition of water. It melts unsharply at 55–80°.

*Example 2*

8 g. (0.05 mole) of 2-methyl-1,3-pentadiene-1,4-sultone and 7.5 g. (0.05 mole) of p-acetaminoaniline are intimately mixed and slowly heated with stirring in an open flask. The mixture represents a thinly liquid melt at 120° C., and condensation begins at 125–130° C., continuing with slight foaming and a spontaneous temperature rise and then ceasing with sudden solidification at about 155–160° C. The product is crushed while still warm and then recrystallized from hot methanol. The twice recrystallized 2-methyl-1,3-pentadiene-N-(p-acetaminophenyl)-1,4-sultam forms white, felted needles M. P. 223.5–225.0°. Yield: 14.6 g. or nearly 90% of theory. The substance turns yellow in the light.

When hydrogenated in the presence of Raney nickel, it converts readily and smoothly into 2-methylpentane-N-(acetaminophenyl)-1,4-sultam. This substance on precipitation from methanol with water forms white needles and laminae of M. P. 155.0–159.5°.

The N-acetyl group can be eliminated from the unsaturated as well as from the saturated sultam very easily by boiling for several hours with aqueous-methanolic caustic potash solution without splitting of the sultam ring.

The 2-methyl-1,3-pentadiene-N-(p-aminophenyl)-1,4-sultam so obtained melts at 151–153° after recrystallization from water-methanol.

The saturated compound, 2-methylpentane-N-(p-aminophenyl)-1,4-sultam, forms white rods and flakes of M. P. 137–140°.

Example 3

1.8 g. (0.01 mole) of 2,3-dimethyl-1,3-pentadiene-1,4-sultone and 1.1 g. of p-toluidine are slowly heated to 165° C. in an open flask and kept at this temperature for about 10 minutes. The cooled and congealed melt is freed of acidic and basic components by successive extraction with cold normal caustic soda solution and with cold normal hydrochloric acid, and the insoluble component, 2,3-dimethyl-1,3-pentadiene-N-(p-tolyl)-1,4-sultam, is recrystallized from methanol after clarification with charcoal. The substance forms colorless long needles of M. P. 145°. It slowly turns pale yellow in the air.

Example 4

2.15 parts of 2-methyl-3,4-(6'-methylcyclohexanol)-1,3-butadiene-1,4-sultone, which can be prepared from pulegone (cf. T. Morel, P. E. Verkade, Rec. trav. chim. des Pays-Bas 67:539 (1948) and 68:619 (1949)), are boiled under reflux with 10 parts by volume of aniline for 90 minutes. After only 25 minutes the solution begins to cloud up and to darken. Sulfur dioxide escapes. The excess aniline is now distilled off under vacuum. The residue solidifies on treatment with about 30 parts by volume of N—HCl and storage at low temperature. The resultant 2-methyl-3,4-(6'-methylcyclohexano)-1,3-butadiene-N-phenyl-1,4-sultam is filtered off by suction, washed with water, dissolved in 50 parts by volume of methanol, clarified by means of charcoal, and purified by evaporation to about 35 parts by volume and cooling. Yield: approx. 70% of theory. The substance forms colorless crystals of M. P. 121° which quickly turn yellow in the light. It shows high stability to strong acids at elevated temperture.

Both double bonds can easily be hydrogenated by means of hydrogen and Raney nickel in methanol to yield the saturated sultam. The yield after recrystallization from the severely concentrated methanol solution is about 80% of theory. The substance forms colorless, lightfast needles of M. P. 125°.

I claim:
1. Process for the preparation of unsaturated sultams which comprises heating a sultone having the general formula:

in which R' is a member selected from the group consisting of divalent butadiene, methyl butadiene and dimethyl butadiene radicals, with a primary amine having the general formula H₂N—R, in which R is a member selected from the group consisting of phenyl, p-tolyl, p-aminophenyl and p-acetamino phenyl radicals to a temperature sufficient to split off water, and recovering the sultam formed.

2. Process according to claim 1, in which said primary amine is an aniline.

3. A sultam having the general formula:

in which R is a member selected from the group consisting of phenyl, p-tolyl, p-amino phenyl and p-acetamino phenyl radicals and R' is a member selected from the group consisting of divalent butadiene, methyl butadiene and dimethyl butadiene radicals.

4. 2-methyl-1,3-pentadiene-N-phenylsultam.

5. 2-methyl-1,3-pentadiene - N - (p-acetaminophenyl-1,4-sultam.

6. 2-methyl-1,3-pentadiene-N-(p-aminophenyl) - 1,4-sultam.

7. 2,3-dimethyl-1,3-pentadiene-N-(p-tolyl) - 1,4 - sultam.

8. 2-methyl-3,4-(6'-methylcyclohexano) - 1,3 - butadiene-N-phenyl-1,4-sultam.

No references cited.

UNITED STATES PATENT OFFICE
Certificate of Correction

Patent No. 2,917,512

December 15, 1959

Burckhardt Helferich

It is hereby certified that error appears in the printed specification of the above numbered patent requiring correction and that the said Letters Patent should read as corrected below.

Column 3, line 16, *Example 4*, for "-(6'-methylcyclohexanol)-" read — -(6'-methylcyclohexano-) —; column 4, lines 5 to 8, claim 1, the formula should appear as shown below instead of as in the patent—

Signed and sealed this 1st day of March 1960.

[SEAL]

Attest:
KARL H. AXLINE,
*Attesting Officer.*

ROBERT C. WATSON,
*Commissioner of Patents.*